United States Patent [19]

Jäger

[11] Patent Number: 5,088,177
[45] Date of Patent: Feb. 18, 1992

[54] METHOD AND APPARATUS FOR PRODUCING CONVEYOR BELTS HAVING RIGID CARRIER MEANS

[76] Inventor: Arnold Jäger, Gehrbergsweg 6, 3164 Burgdorf, Fed. Rep. of Germany

[21] Appl. No.: 546,398

[22] Filed: Jun. 29, 1990

[30] Foreign Application Priority Data

Jun. 30, 1989 [DE] Fed. Rep. of Germany ....... 3921518

[51] Int. Cl.$^5$ .......................................... B23P 11/02
[52] U.S. Cl. .................................... 29/450; 29/509; 29/525.1; 29/525; 198/850
[58] Field of Search ................. 29/450, 505, 509, 525, 29/525.1, 433; 403/282, 395, 274, 384, 373, 406.1, 409.1; 198/844.1, 850, 698, 699, 844.2; 411/439

[56] References Cited

U.S. PATENT DOCUMENTS 2,367,657 1/1945 Boersma .................... 29/525.1
4,023,671 5/1977 Krämer ....................... 195/850 X
4,815,587 3/1989 Musil ......................... 198/844.2
5,020,658 6/1991 Jager et al. ................ 198/850 X

FOREIGN PATENT DOCUMENTS 2535903 2/1977 Fed. Rep. of Germany ...... 198/850

Primary Examiner—Joseph M. Gorski
Assistant Examiner—S. Thomas Hughes
Attorney, Agent, or Firm—Robert W. Becker & Associates

[57] ABSTRACT

A method and apparatus for producing conveyor belts having rigid carriers is proposed. The conveyor belts have elastic cover layers and are provided with fasteners that overlap the carriers to hold the same. The fasteners are first connected to the conveyor belt, whereupon the carriers are forced between the conveyor belt and the fasteners, accompanied by elastic deformation of the cover layer. This considerably simplifies the mounting and fixation of the carriers.

3 Claims, 1 Drawing Sheet

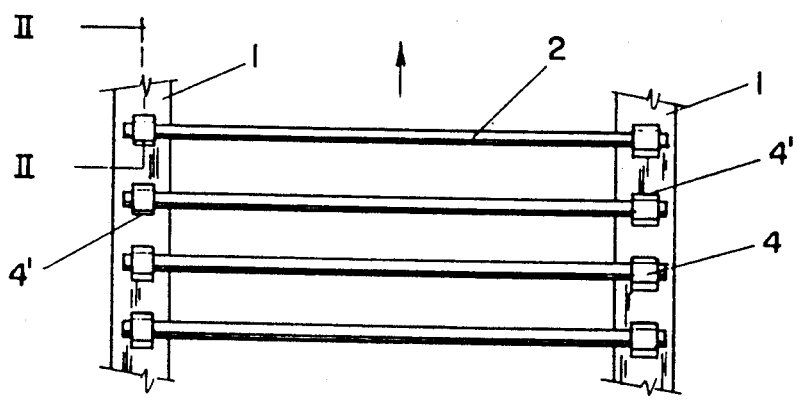
FIG-1
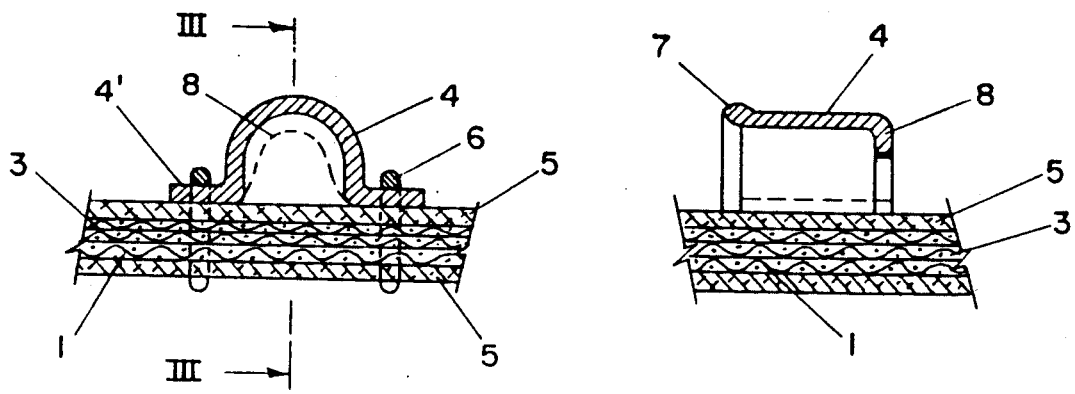
FIG-2  FIG-3
FIG-4
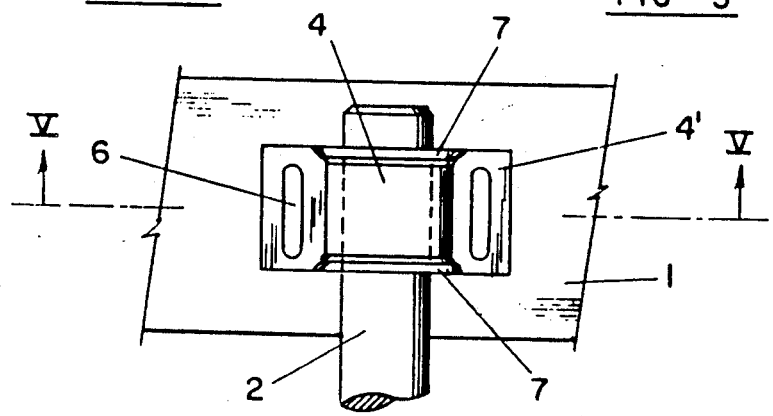
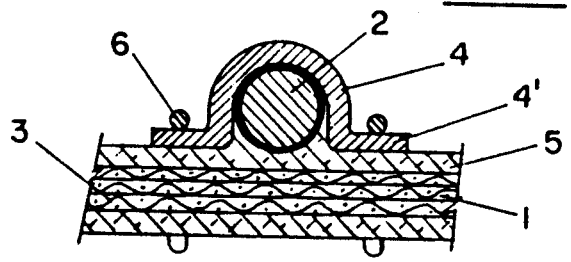
FIG-5
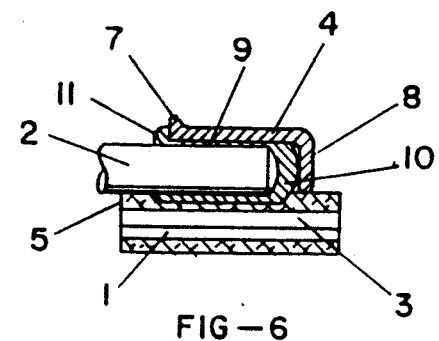
FIG-6

METHOD AND APPARATUS FOR PRODUCING CONVEYOR BELTS HAVING RIGID CARRIER MEANS

BACKGROUND OF THE INVENTION

The present invention relates to a method and apparatus for producing conveyor belts that are each provided with a reinforcing insert disposed below an elastic cover layer, and with rigid carrier means that rest on the cover layer and are held by fastening means that overlap the carrier means and are secured to the conveyor belt. The present invention relates in particular to fastening means that comprise clamp means into which staple means are shot. The present invention is particularly suitable for belts or bands with rods for rod-belt conveyors of agricultural equipment.

Pursuant to the known state of the art, to produce conveyor belts of the aforementioned general type the carrier means, i.e. the rods or bars, are first placed upon the belts. The fastening means are thereupon attached by shooting in the staples or the like. Such method of manufacture makes it necessary to have mechanical equipment in order to be able to attach the fastening means in the prescribed manner. Repairs and assembly at the site, for example while working in the field, are therefore precluded.

It is an object of the present invention to provide a method that considerably simplifies the mounting and assembly of the carrier means on the conveyor belts, so that these operations do not require actual manufacture and can also be carried out by someone who is less skilled.

BRIEF DESCRIPTION OF THE DRAWING

This object, and other objects and advantages of the present invention, will appear more clearly from the following specification in conjunction with the accompanying schematic drawing, in which:

FIG. 1 shows a portion of the length of the normally endless, rotating body of one exemplary embodiment of the inventive belt or band with rods for a rod-belt conveyor of agricultural equipment;

FIG. 2 is a partial, longitudinal cross-sectional view through one side belt loop of the rod belt of FIG. 1, and in particular is taken along the line II—II in FIG. 1, although in the not-yet finished state of a conveyor belt;

FIG. 3 is a cross-sectional view taken along the line III—III in FIG. 2;

FIG. 4 is a plan view of a fastening location of a carrier means along a portion of the length of a belt body, and in particular in the mounted state of a carrier means;

FIG. 5 is a cross-sectional view taken along the line V—V in FIG. 4;

FIG. 6 is a cross-sectional view through a side belt loop showing a modified fastening location for a rod end.

SUMMARY OF THE INVENTION

The method of the present invention is characterized primarily by first connecting the fastening means to the conveyor belt, and then forcing the carrier means between the conveyor belt and the fastening means, accompanied by elastic deformation of the cover layer.

Thus, pursuant to the present invention the attachment of the fastening means, for example clamp means, is first effected independently of the carrier means; only after the fastening means are in place are the carrier means attached by being forced beneath the fastening means, accompanied by deformation of the cover layer of the conveyor belt. Thus, the production of the conveyor belts can be effected a meter at a time; the mounting of the carrier means is then effected along lengths of the conveyor belt by simply being driven in. This can be accomplished at any location. Difficulties are precluded because the separations and spacings of the carrier means are already fixed by the prefabricated belts with their fastening means.

It should be noted that the inventive procedures are meaningful not only for new manufacture but also for repair of the aforementioned conveyor belts.

Further specific features of the present invention will be described in detail subsequently.

DESCRIPTION OF PREFERRED EMBODIMENTS

Referring now to the drawing in detail, the belt or band with rods illustrated in FIG. 1 comprises two belt loops 1 that are disposed at the edges of the continuous belt; the belt loops 1 are interconnected by rigid, parallel steel rods or bars 2 that are disposed transversely. These rods 2 serve for conveying, but also sorting, of, for example, potatoes, turnips, beets, etc.

The two endless belt loops 1 have a pull-resistant core 3 in the form of a fabric member, and also have an upper and lower cover layer 5 of rubber. The core 3 is also permeated with rubber. All of the components of the belt loops 1 are securely and strongly joined together by means of the rubber.

The rods 2 are secured to the belt loops 1 via overlapping brackets or clamp means 4, the bent or angled-off ends 4' of which rest upon the cover layer 5. The ends 4' are held on the belt body via staple means 6 that are shot or driven in without the need to remove any material. In so doing, the staple means 6 pass through the ends 4' as well as through the bodies of the belt loops 1 and can be bent away or slightly back on the opposite side of the belt loops to preclude the staple means 6 from slipping out.

The important thing is that the clamp means 4 first be secured in the aforementioned manner, as shown in FIG. 2, and in particular in such a way that a majority of the length of the belt loops 1 are equipped in a precisely spaced manner with the clamp means 4. The generally finitely produced belt loops 1 can now be joined together in an endless manner. The rods 2 are thereupon forced in between the clamp means 4 and the upper cover layer 5 via a longitudinal movement, accompanied by an elastic deformation of the rubber of the cover layer 5 located below the clamp means 4. This advantageously takes place in such a way that the rubber that is deformed as a result of the forcing-in of the rods 2 fills all the free spaces between the clamp means 4 and the belt loop 1. In so doing, a considerable amount of stress is introduced into the rubber that reliably holds the ends of the rods 2.

If a belt loop 1 is damaged, it can be released from its rods 2 by pulling these rods out. After the belt loop has been replaced, the ends of the rods are again forced in in order in this way to again provide a rod belt that is completely ready for use. This applies not only for entire belt loops 1, but also for lengths of these belts, with these lengths then being adapted to be joined to the remaining portions of the belt via suitable connecting means.

To facilitate forcing or driving in of the rods 2, the rims 7 of the clamp means 4 can be bent or angled outwardly. If desired, the ends of the rods 2 can also be rounded or beveled. However, the preferred measure is to bend or angle off the rims of the clamp means 4, because the clamp means 4 are stamped parts and can therefore be provided right from the beginning with the angled or bent rims.

The method of the present invention is preferably applied with the aforementioned rod belts, although it can also be used with other conveyor belts that are elastically resilient on the upper surface, and that must be provided with carrier means such as hooks, buckets, etc. The present invention can also be utilized with individual conveyor belts.

In the embodiment illustrated in FIG. 3, on the laterally outer side, at the end of the rod 2, the clamp means 4 is angled off inwardly in a direction toward the belt loop 1. This angled-off rim is designated by the reference numeral 8 and has a stopping or limiting function during the introduction of a rod 2 into the clamp means 4. Accordingly, the rods 2 are always introduced to the stop or rim 8 in order in this manner to insure precise mutual spacing of the two belt loops 1 and a more precise positioning of the individual components relative to one another. In addition, the position of the rods 2 is protected.

In order to increase the static friction between the ends of the rods 2 and the belt loops 1 and clamp means 4, it is possible, as shown in FIG. 6, to provide a liner or sleeve 9 that is made of an elastomeric material, such as rubber, and that closely surrounds the ends of the rods. This sleeve can be radially preloaded. The sleeve 9 can also have the shape of a cap with a transverse end wall 10 that is disposed adjacent to the end faces of the rod ends, facilitates introduction of the rods 2, and prevents the sleeves 9 from sliding off. The rim 8 extends downwardly quite a distance, and serves as an end stop. At that end remote from the end face of the rod 2, the sleeve 9 can be thickened to form the bead 11.

It should be understood that both rims of the clamp means can also be bent upwardly, as shown in the embodiment of FIG. 4, so that it makes no difference which way the clamp means is turned. However, the preferred embodiment is that illustrated in FIGS. 2 and 3, since this embodiment provides an end stop.

The present invention is, of course, in no way restricted to the specific disclosure of the specification and drawing, but also encompasses any modifications within the scope of the appended claims.

What I claim is:

1. In a method of producing conveyor belts that are provided with a reinforcing insert disposed below an elastic cover layer, and with rigid carrier means that rest on said cover layer and are held by fastening means that overlap said carrier means and are secured to a conveyor belt, the improvement including the steps of:
   first connecting said fastening means to a conveyor belt; and
   then forcing said carrier means between said conveyor belt and said fastening means thereby elastically deforming said cover layer.

2. A method according to claim 1, which includes the steps of first connecting said fastening means to a significant length of said conveyor belts, and then providing sections of said length with said carrier means.

3. The method of claim 1, wherein said conveyor belts are rod-belt type conveyors used with agricultural equipment.

* * * * *